United States Patent [19]

Kondo

[11] 4,041,513
[45] Aug. 9, 1977

[54] SHUTTER FOR PHOTOGRAPHIC CAMERAS

[75] Inventor: Toshihiro Kondo, Chofu, Japan

[73] Assignees: Toshihiro Kondo, Tokyo; Fuji Photo Film Co., Ltd., both of Japan

[21] Appl. No.: 668,807

[22] Filed: Mar. 19, 1976

[30] Foreign Application Priority Data

Mar. 19, 1975 Japan .................. 50-33196
May 14, 1975 Japan .................. 50-57134

[51] Int. Cl.² ............................ G03B 9/28; G03B 9/32
[52] U.S. Cl. ........................................ 354/241; 354/242
[58] Field of Search ............ 354/241, 242, 234, 235, 354/226, 146

[56] References Cited

U.S. PATENT DOCUMENTS 3,685,423  8/1972  Dahlgren ............................ 354/241

FOREIGN PATENT DOCUMENTS

696,454   10/1964  Canada ................. 354/241
1,274,441  8/1968  Germany ............... 354/241
2,255,835  5/1974  Germany ............... 354/242
7,309 of    1896   United Kingdom ... 354/241
141,750   4/1960  U.S.S.R. ............... 354/241

Primary Examiner—Donald A. Griffin

[57] ABSTRACT

A shrinkable accordion shaped shutter blind is provided an end of which is fixed at one side of a film aperture and the other end of which is made free to move across the film aperture. The free end of the shutter blind is movable back and forth across the film aperture by a mechanical or electromagnetic operating device. In a preferred embodiment of the invention, a pair of the accordion shaped shutter blinds are provided to make a slit of exposure to expose a film behind the film aperture.

6 Claims, 24 Drawing Figures

SHUTTER FOR PHOTOGRAPHIC CAMERAS

BACKGROUND OF THE INVENTION

1. Field of the Invention

This invention relates to a novel shutter for a photographic camera, and more particularly to a novel shutter blind and means for operating the shutter blind to expose a film in the photographic camera. The shutter blind in accordance with the present invention does not belong to any type of the conventional shutter blind. In contrast to the conventional focal plane shutter which "moves" along the focal plane, the shutter blind of this invention "shrinks" and "expands" along the focal plane.

2. Description of the Prior Art

In photographic cameras, it has long been desired that the number of parts incorporated into various mechanisms in the camera body should be reduced to simplify the structure of the camera and lower the cost of manufacting thereof. Further, from the viewpoint of the size of the camera also, it is desirable to simplify the various mechanisms in the camera body. Particularly, the shutter mechanism is considerably complicated, and accordingly, the mechanism thereof is always desired to be simplified as much as possible.

Conventional focal plane shutters employ a flexible shutter blind wound on a spring drum. In order that the flexible shutter blind may resist an instantaneous tension exerted thereon, the shutter blind must be made of tough material. In addition, in order to pull the shutter blind wound on a spring drum by overcoming the force of the spring, means for operating the shutter blind must have a great force. Further, the camera which employs such a shutter mechanism has a defect in that the camera body is apt to be accidentally moved by the shock caused by the instantaneous tension exerted on the shutter blind. The space occupied by the spring drum is still large and is desired to be reduced.

SUMMARY OF THE INVENTION

The primary object of the present invention is to provide a shutter blind for closing and opening a film aperture in a camera body which occupies a small space.

Another object of the present invention is to provide a shutter blind which can be operated with a small force.

Still another object of the present invention is to provide a shutter blind which is not exerted with a large tension when it is operated by a shutter operating means.

A further object of the present invention is to provide a shutter blind which can be made of material which is not so strong against tension.

A still further object of the present invention is to provide a shutter blind which can be opened or closed by a simple mechanism.

Another specific object of the present invention is to provide a shutter operating means for opening and closing the accordion shaped shutter blind.

Still another object of the present invention is to provide a shutter operating means which occupies a small space within a camera body.

A further object of the present invention is to provide a shutter operating means which is driven completely by an electric circuit.

The shutter blind in accordance with the present invention is made of flexible light impervious sheet material formed into an accordion shape. The accordion shaped shutter blind is shrunk and extended along a film aperture to open and close the same. Therefore, the shutter blind in accordance with the present invention does not occupy a large space within a camera body and is not exerted with a large tension. The accordion shaped shutter blind is folded on one side of the aperture to open the same and is extended over the aperture to close the same.

The shutter operating means in accordance with an embodiment of the present invention comprises a permanent magnet fixed to a free end of the accordion shaped shutter blind and a series of electromagnetic coil arranged in a line along the direction of the expansion of the shutter blind. The series of electromagnetic coils drive the shutter blind therealong by an electromagnetic force induced between the permanent magnet and the same. In other words, the permanent magnet fixed to the free end of the shutter blind and the series of the electromagnetic coils constitute a linear motor.

DESCRIPTION OF THE PREFERRED EMBODIMENTS

Figure 1:
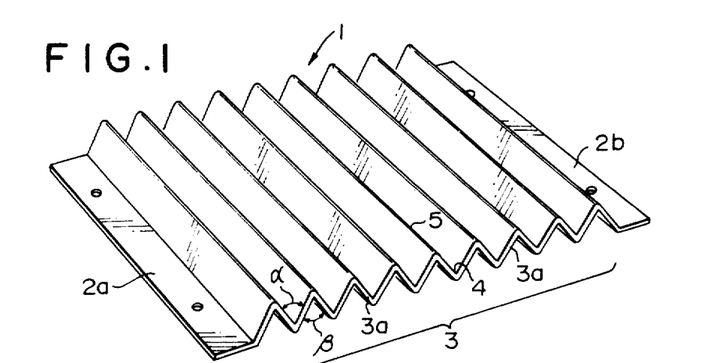
FIG. 1 is a perspective view showing the basic structure of an embodiment of the shutter blind in accordance with the present invention.
Figure 2:
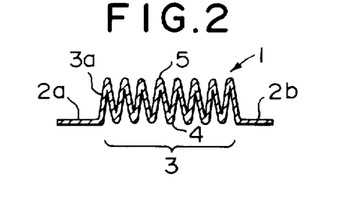
FIG. 2 is a side sectional view of the shutter blind as shown in FIG. 1 in the state wherein the shutter blind is shrunk.

An embodiment of the shutter blind in accordance with the present invention is illustrated in FIGS. 1 and 2. The shutter blind 1 consists of a pair of end members 2a and 2b extending lateral to the direction of expansion thereof and an accordion shaped intermediate portion 3 having a number of accordion pleats 3a and folding lines 4 and 5 therebetween on which the intermediate portion 3 is folded alternately in the opposite sides. The intermediate portion 3 can be folded as shown in FIG. 2 by decreasing angles $\alpha$ and $\beta$ formed between adjacent pleats 3a thereof.

Figure 3:
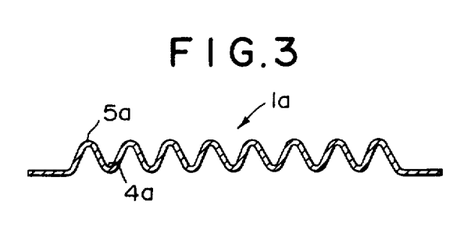
FIG. 3 is a side sectional view of a shutter blind in accordance with another embodiment of the present invention.

The shutter blind 1 as shown in FIGS. 1 and 2 is made of flexible sheet material which is impervious to light. Elongated rectangular rigid members made of metal or plastics cna be attached to a sheet material with small spaces therebetween to form said pleats 3a and folding lines 4 and 5. Alternatively, a comparatively rigid sheet made of light impervious plastic material containing black pigments can be used without the rigid members. The weight of the shutter blind 1 should preferably be as small as possible so as to be driven with a small force. The folding lines 4 and 5 are illustrated to have acute angles in FIGS. 1 and 2. However, the folding lines 4 and 5 may not always be provided and can be formed into curved portions 4a and 5a as in FIG. 3. The shutter blind 1a as shown in FIG. 3 has a wave-formed cross section. Angles $\alpha$ and $\beta$ formed between adjacent pleats 3a should preferably be varied within the range of 0° to 60° in order that the shutter blind 1 may not be exerted with a large tension.

The shutter blind 1 in accordance with this invention occupies a very small space when it is folded as shown in FIG. 2. In case that the shutter blind 1 closes an aperture of the dimension of 35 × 25mm of a 35mm size camera with the angles $\alpha$ and $\beta$ both set as 60° with the width of the pleats 3a set as 4mm and with the thickness of 0.2mm, there should be provided 20 pleats and the shutter blind having the 20 pleats is folded to have a length of 4mm. Since the both ends of the shutter blind have end members 2a and 2b of the width of 4mm, the overall length of the shutter blind 1 becomes 12mm when folded to open a film aperture. When it is desired to further decrease the overall length, the width of the pleats 3a is enlarged to decrease the number thereof.

Two shutter blinds of the above described structure are provided on both sides of an aperture so that one shutter blind located on one side of the aperture will serve as a leading shutter blind and the other shutter blind located on the other side of the aperture will serve as a trailing shutter blind.

Figure 4:
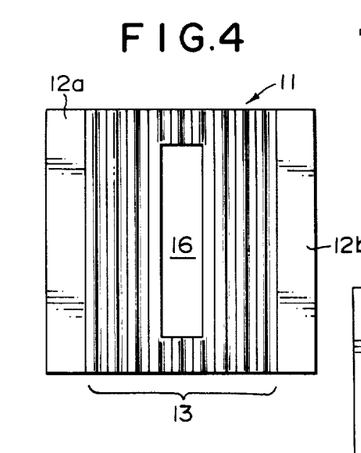
FIG. 4 is a front view of the shutter blind in accordance with still another embodiment of the present invention.

In the above described embodiment, the aperture is opened and closed by one of the shutter blinds. However, it is possible to provide a slit or opening in the shutter blind and expose a film behind the aperture by moving the slit or opening of the shutter blind in the direction lateral to the slit or opening. One example of such a type of the shutter blind is illustrated in FIG. 4. Referring to FIG. 4, a shutter blind 11 consisting of a pair of end members 12a and 12b and an accordion shaped intermediate portion 13 is provided in the middle of the intermediate portion 13 with an exposure opening 16 which extends lateral to the direction in which the accordion shaped portion 13 is shrunk and expanded. The shutter blind 11 in accordance with this embodiment is partly shrunk and expanded to move the opening 16 with both said end members 12a and 12b thereof fixed at both ends of the aperture.

Figure 5:
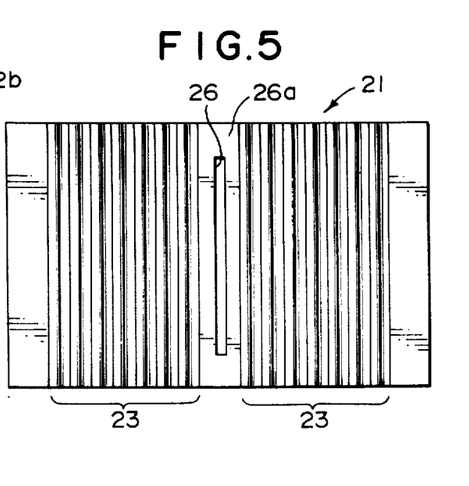
FIG. 5 is a front view of the shutter blind in accordance with a further embodiment of the present invention.

Another embodiment of the shutter blind provided with a slit or opening is illustrated in FIG. 5. The shutter blind 21 in accordance with this embodiment is provided with a slit 26 in a flat member 26a provided in the middle of an accordion shaped portion 23. The shutter blind 21 of this embodiment is also used with both ends thereof fixed at both ends of an aperture.

Figure 6:
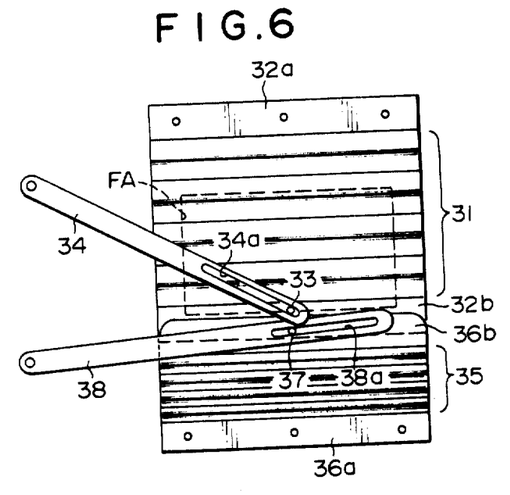
FIG. 6 is a front view showing an embodiment of a shutter operating mechanism to operate an accordion shaped shutter blind in accordance with the present invention.

Now various shutter mechanism for operating the above described shutter blinds will be described in detail. One simple example of a shutter driving means is illustrated in FIG. 6. In the embodiment shown in FIG. 6, two shutter blinds 31 and 35 of the type as shown in FIGS. 1 to 3 are employed to open and close a film aperture FA independently. One shutter blind 31 serves as a leading shutter blind and the other shutter blind 35 serves as a trailing shutter blind. One end member 32a of the leading shutter blind 31 is fixed to an end of the aperture FA and the other end member 32b thereof is made free to move up and down in the drawing. One end member 36a of the trailing shutter blind 35 is fixed to the other end of the aperture FA and the other end member 36b thereof is made free to move up and down. The free end members 32b and 36b are provided at the middle point thereof with pins 33 and 37, respectively. The pin 33 fixed to the end member 32b of the leading blind 31 is engaged with an elongated slot 34a formed in an end of a lever 34, and the pin 37 fixed to the end member 36b of the trailing blind 35 is engaged with an elongated slot 38a formed in an end of a lever 38. By swinging the levers 34 and 38, the free end members 32b and 36b are moved back and forth to open and close the film aperture FA. The two levers 34 and 38 are caused to swing independently of each other to control the exposure time. The lever 34 engaged with the leading blind 31 is first swing counterclockwise to open the aperture FA, then the lever 38 engaged with the trailing blind 35 is swung counterclockwise to close the aperture FA. The time interval between the start of the swing of the lever 34 and that of the swing of the lever 38 determines the exposure time. Since the shutter blind in accordance with the present invention has a very simple structure and small weight, the shutter blind can be driven by a simple operating means as described above. Further, the shutter operating means as shown in FIG. 6 is advantageous in that the shutter blinds 31 and 35 are shrunk and expanded in the direction in which the film aperture FA has a smaller length, and accordingly, the length of the shutter blinds 31 and 35 can be made small.

Figure 7:
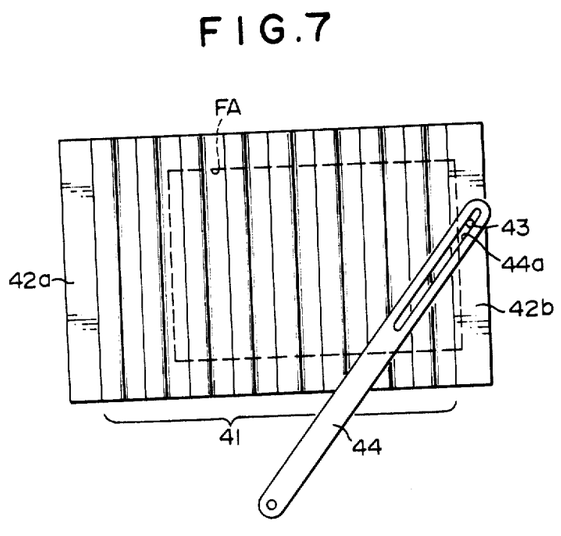
FIG. 7 is a front view showing another embodiment of a shutter operating mechanism to operate an accordion shaped shutter blind in accordance with the present invention.

Although in the above described embodiment two shutter blinds are employed, it is possible to open and close a film aperture with a single shutter blind. Such an example is shown in FIG. 7. A shutter blind 41 is fixed to a film aperture FA at an end thereof 42a with the other end thereof 42b with the other end thereof 42b made free to move across the aperture FA. The free end 42b thereof is provided with a pin 43 fixed thereto which is engaged with a slot 44a formed in an end of a lever 44. By swinging the lever 44, the free end 42b of the shutter blind 41 is moved back and forth to open and close the film aperture FA.

Figure 8A:
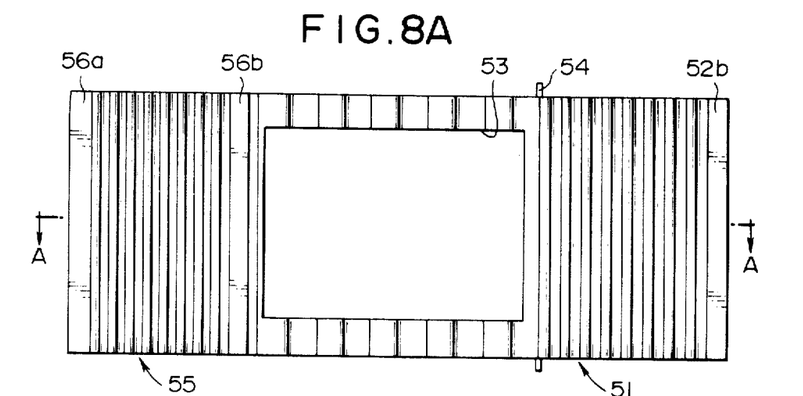
FIG. 8A is a front view of a shutter blind in accordance with a still further embodiment of the present invention.
Figure 8B:
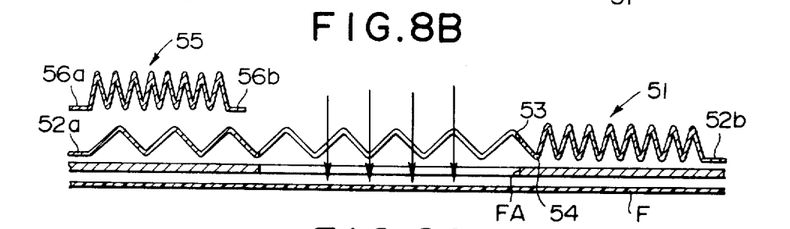
FIG. 8B is a side sectional view showing the shutter blind as shown in FIG. 8A wherein the shutter blind is in the open state.
Figure 8C:
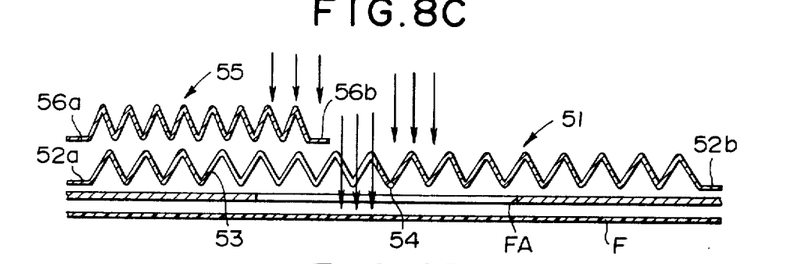
FIG. 8C is a view similar to FIG. 8B showing the shutter blind as shown in FIG. 8A wherein the shutter blind forms a slit for exposure.
Figure 8D:
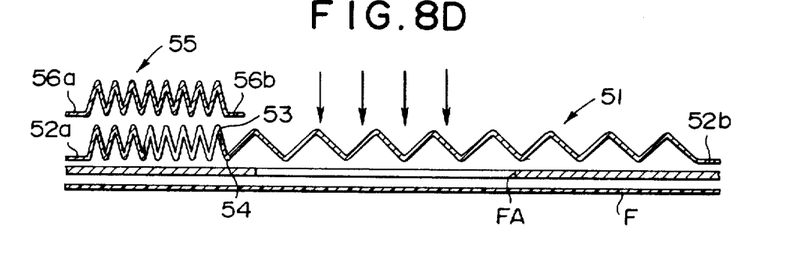
FIG. 8D is a view similar to FIG. 8B showing the shutter blind as shown in FIG. 8A wherein the shutter blind is in the closed state.

FIGS. 8A to 8D show another embodiment of the shutter blind in accordance with the present invention. In this embodiment, a shutter blind 51 serving as a leading blind having an opening 53 and a shutter blind 55 serving as a trailing blind having no opening are employed. The leading shutter blind 51 has its both end members 52a and 52b fixed at both ends of a film aperture FA and only the intermediate accordion shaped portion thereof is made movable back and forth by shrinking a part and expanding the remaining part thereof to cross the film aperture FA. The accordion shaped sheet portion is provided with a pin 54 extending laterally to be driven. The trailing blind 55 has its one end member 56a fixed at one end of the film aperture FA above said end member 52a of the leading blind 51, and has its the other end member 56b made free to move across the film aperture FA. FIGS. 8A and 8B show a state wherein the film aperture FA is opened, where the opening 53 of the leading blind 51 is aligned with the film aperture FA and the trailing blind 55 is shrunk to fully open the film aperture FA. FIG. 8C shows a state where an exposure slit is formed between the free end 56b of the trailing blind 55 and one end of the opening 53 of the leading blind 51 and the film aperture FA is partly opened and a film F located therebehind is exposed to light through the slit. The leading blind 51 starts from the position as shown in FIG. 8D where the leading blind 51 completely closes the film aperture FA. In case that the trailing blind 55 runs after the leading blind 51 before the leading blind 51 fully opens the film aperture FA as shown in FIG. 8C, a film F behind the film aperture FA is exposed to light passing through the slit formed between the leading end of the opening 53 of the leading blind 51 and the leading end of the trailing blind 55. In this case, a high shutter speed can be obtained. When the trailing blind 55 starts to run after the leading blind 51 after the leading blind 51 has completely opened the film aperture FA as shown in FIG. 8B, a slow shutter speed can be obtained.

Figure 9:
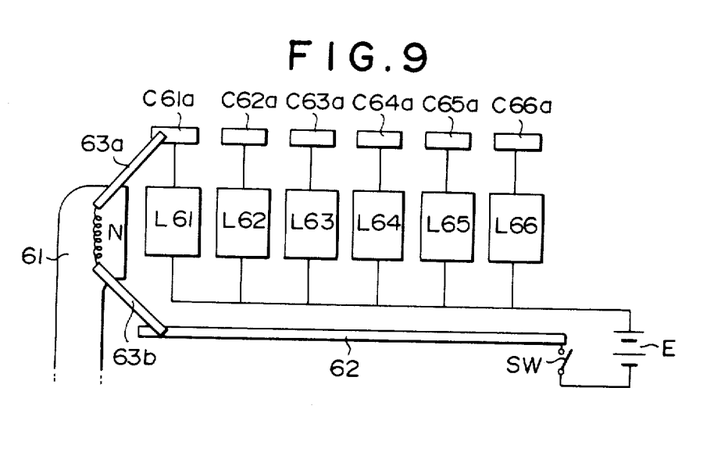
FIG. 9 is a diagram showing the principle of a linear motor employed in a shutter operating means in accordance with the present invention.

Another embodiment of the present invention wherein the shutter blind is operated by means of a linear motor will hereinbelow be described in detail with reference to FIGS. 9 to 18. FIG. 9 shows the principle of the linear motor type shutter operating means in accordance with this embodiment.

Referring to FIG. 9, print coils L61 to L66 are arranged in a line to be energized to attract a permanent magnet 61 and drive the latter in the direction in which the coils are arranged. One end of each coil is connected with a power source E and the other end thereof is connected with a contact C61a to C66a. The electromagnetic print coils L61, L62, L63, L64, L65 and L66 are connected with contacts C61a, C62a, C63a, C64a C65a and C66a, respectively. The contacts C61a to C66a are separated from each other and arranged in a line in parallel to the print coils L61 to L66. The permanent magnet 61 has a pair of brushes 63a and 63b, one of which 63a is to slide successively in contact with said contacts C61a to C66a as the permanent magnet 61 moves in the direction in which the coils L61 to L66 and the contacts C61a to C66a are arranged. The other brush 63b slides in contact with a slide contact 62 extending in parallel to said line of contacts C61a to C66a so that the brush 63b will slide always in contact therewith when the permanent magnet 61 moves along the line of contacts C61a. The slide contact 62 is connected with the power sorce E by way of a switch SW. The brushes 63a and 63b are electrically connected with each other. When the switch SW is closed in FIG. 9, the first coil L61 is energized to attract the permanent magnet 61 to the right. As the permanent magnet 61 is moved to the right, the brush 63a is separated from the first contact C61a and is brought into contact with the second contact C62a. Therefore, the first coil L61 is deenergized and the second coil L62 is energized to attract the permanent magnet 61 further to the right. Thus, the permanent magnet 61 is attracted successively to the right along the line of the coils L61 to L66.

In the above embodiment as shown in FIG. 9, a series of contacts C61a to C66a and brushes 63a and 63b are employed for successively moving the permanent magnet 61 to the right. However, it will be noted that the change-over of the coils L61 to L66 from one to another can be conducted without using the combination of the contacts and brushes. For instance, a no-contact type position detecting means can be employed which detects the position of the permanent magnet 61 and provides a signal to a coil adjacent to the position thereof so that the permanent magnet 61 will be attracted to the right. As the no-contact position detecting means, various conventional means such as optical position detectors or magnetic position detectors can be used. Further, although the coils L61 to L66 shown in FIG. 9 are separated from each other, they should preferably be overlapped partly with each other to effect a smooth movement of the magnet 61. Even in this case, of course, the coils L61 to L66 must be electrically isolated from each other.

Figure 10:
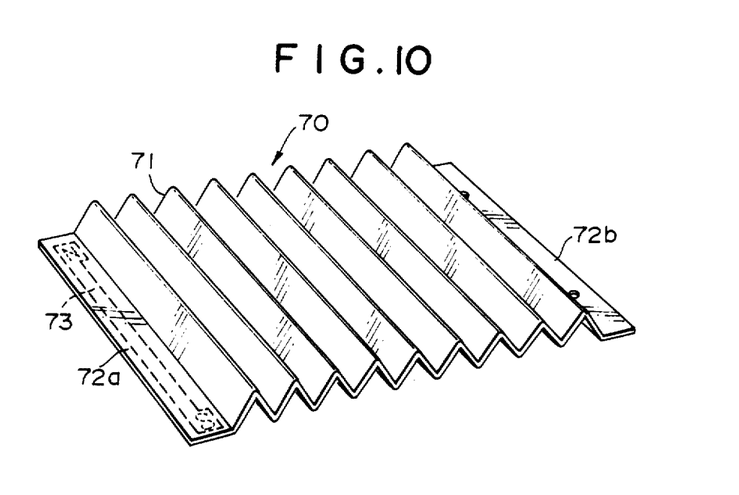
FIG. 10 is a perspective view showing an example of a shutter blind which can be driven by a shutter operating means employing a linear motor as shown in FIG. 9.

The shutter blind in accordance with the present invention which is used in combination with the above described embodiment of the shutter operating means employing a linear motor is illustrated in FIG. 10. The shutter blind 70 has a pair of rigid end members 72a and 72b at both ends of an accordion shaped blind portion 71. One end memnber 72b is fixed to a part of the camera on one side of a film aperture and the other end member 72a is made free to move across the film aperture. The free end member 72a is provided sealed therein with a thin permanent magnet 73. The permanent magnet 73 has one polarity at one end of the end member 72a near one side of the blind 71 and the other polarity at the opposite end thereof.

A specific embodiment of the linear motor type shutter operating means for operating a shutter blind in accordance with the present invention will hereinbelow be described with reference to FIGS. 11, 12A and 12B. The linear motor type shutter operating means of this embodiment 80 comprises a shutter frame 81 consisting of a pair of end members 81a and 81b and a pair of side members 82 and 83 formed into a rectangular frame, and a pair of accordion shaped shutter blinds 84 and 85 slidably provided in the shutter frame 81. The shutter frame 81 is provided on the inside wall of the side members 82 and 83 with guide grooves 82a, 82b, 83a and 83b (83a and 83b are not shown in the drawing). A shutter blind 84 serving as a leading blind is engaged with the guide grooves 82a and 83a, and a shutter blind 85 serving as a trailing blind is engaged with the guide grooves 82b and 83b. The shutter blinds 84 and 85 have end members 84a, 84b and 85a, 85b at both ends thereof, respectively. End members 84b and 85b are fixed to opposite end members 81a and 81b of the shutter frame 81, and the other end members 84a and 85a are made free to move across the shutter frame 81. The shutter frame 81 further has a film aperture FA to expose a film located therebehind. The guide grooves 82a and 83a in which the leading blind 84 is slidably engaged extend from the left end of the film aperture FA to the right end of the shutter frame 81. The guide grooves 82b and 83b in which the trailing blind 85 is slidably engaged extend from the right end of the film aperture FA to the left end of the shutter frame 81.

Within the guide 82a of the upper side member 82 are provided a series of print coils L80 to L85. One end of each coil is connected with one of a series of contact plates C80 to C85. The contact plates C80 to C85 are arranged in a line on the internal surface of the groove 82a as shown in FIG. 12A. The other end of each coil is connected with the anode of a power source E by way of a switch SW1. The print coils L80 to L85 are designed to have S-polarity on the upper end or face thereof and N-polarity on the lower end or face thereof when energized. Similarly, print coils L86 to L91 are provided in the guide groove 82b as shown in FIG. 12A. The print coils L86 to L91 are connected with a line of contacts C86 to C91 at an end thereof and with the anode of the power source E by way of a switch SW2 at the other end thereof. Between the upper groove 82b and the lower groove 82a is provided an elongated slide contact 88 extending from one end of the film aperture FA to the other end thereof. The slide contact 88 is connected with the cathode of said power source E. The free end members 84a and 85a of the shutter blinds 84 and 85 are provided with pin-like conductive brushes 89 and 90 which are in slidable contact with the contacts L80 to L85 and L88, and L86 to L91 and L88.

Figure 11:
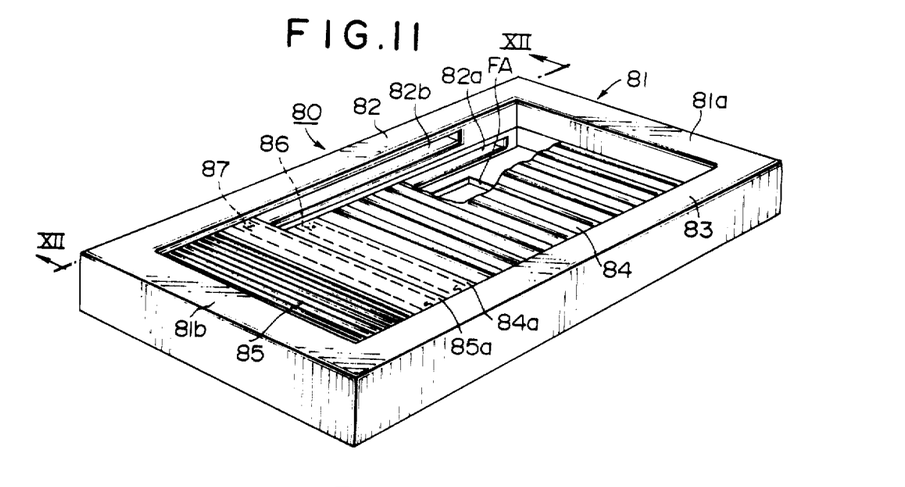
FIG. 11 is a perspective view partly broken showing an embodiment of a shutter operating means for operating an accordion shaped shutter blind by use of a linear motor.
Figure 12A:
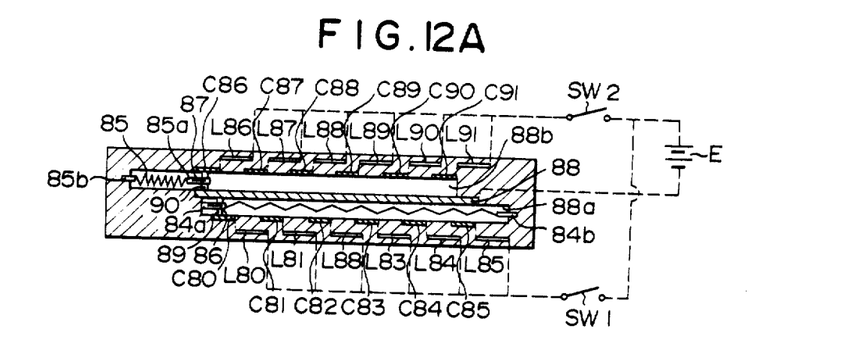
FIG. 12A is a longitudinal sectional view of the shutter operating means as shown in FIG. 11 wherein a shutter blind is in the ready position.
Figure 12B:
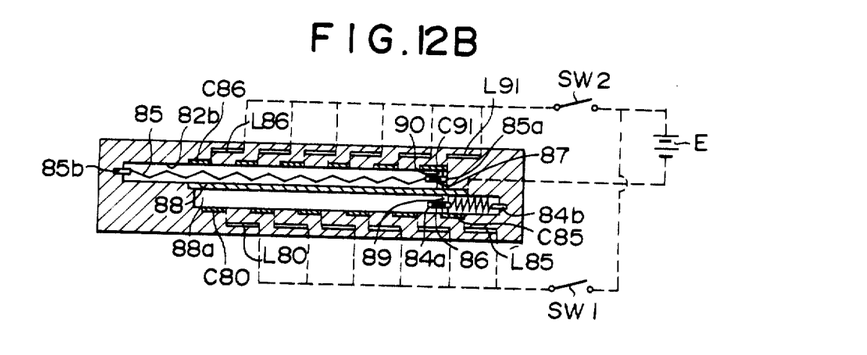
FIG. 12B is a longitudinal sectional view of the shutter operating means as shown in FIG. 12A wherein the shutter blind is in the closed position.

The shutter blinds 84 and 85 are in the closed position in FIGS. 11 and 12A. By closing the first switch SW1, the leading blind 84 starts to move to the right in FIG. 12A to start exposure. Then, the second switch SW2 is closed to move the trailing blind 85 to the right to close the aperture running after the leading blind 84. The time interval between the start of the leading blind 84 and the start of the trailing blind 85 determines the exposure time. The shutter blinds 84 and 85 which are completely moved to the final position is shown in FIG. 12B. After the exposure is finished, both shutter blinds 84 and 85 are returned to their original positions without exposing the film located behind the film aperture FA. The shutter blinds 84 and 85 can be returned to their original positions by a mechanical spring means or by an electric means which reversely energizes said coils.

Another embodiment of the shutter operating device employing a linear motor type driving means will hereinbelow be described referring to FIGS. 13 to 19. This embodiment is characterized in that electromagnetic coils are formed into an effective shape to effectively drive shutter blinds based on a linear motor structure. A pair of guide frames 101a and 101b are disposed in parallel with each other on both sides of shutter blinds 111 and 121. One shutter blind 111 serving as a leading blind is fixed at an end member 112 thereof to a part of a camera body and the other end member 113 thereof is made free to move along the guide frames 101a and 101b. Similarly, the other shutter blind 121 serving as a trailing blind is fixed at an end member 122 thereof to a part of the camera body and the other end member 123 thereof is made free to move along the guide frames 101a and 101b. The free end members 113 and 123 are made of light impervious plastic material and are provided sealed therein with permanent magnets 114 and 124. The permanent magnets 114 and 124 constitute together with print coils (hereinafter described in detail) a linear motor for driving the shutter blinds 111 and 121. The end members 113 and 123 are provided with a pair of brushes 115a, 115b and 125a, 125b, respectively.

Figures 13, 14:
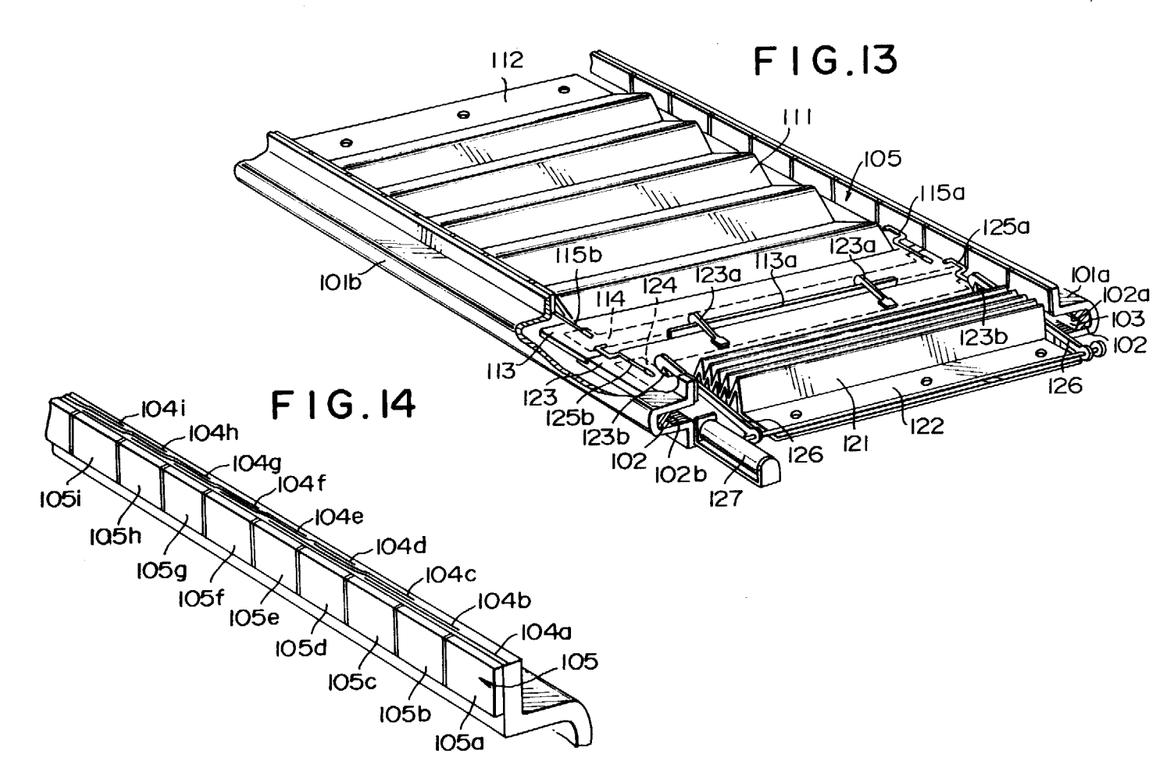
FIG. 13 is a perspective view partly broken away showing another embodiment of the shutter operating means for operating an accordion shaped shutter blind by use of a linear motor.
FIG. 14 is a fragmentary perspective view showing a part of the shutter operating means shown in FIG. 13.
Figure 15:
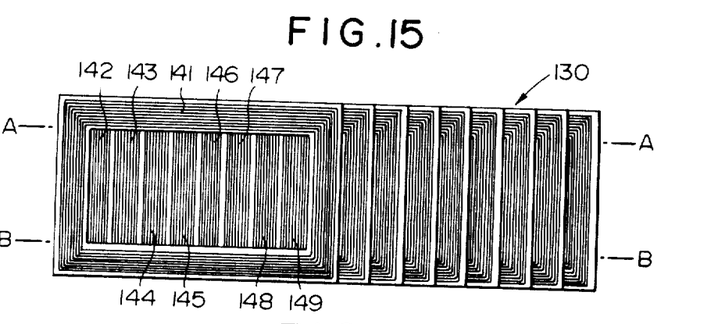
FIG. 15 is a front view showing a series of print coils arranged in a line to be employed in the shutter operating means as shown in FIG. 13.
Figure 16:
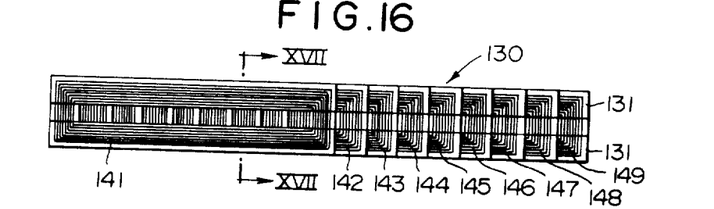
FIG. 16 is a front view showing a series of print coils processed into a form to be incorporated in the shutter operating means as shown in FIG. 13.
Figure 17:
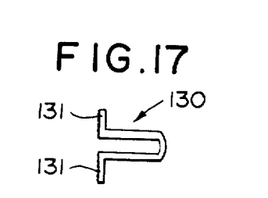
FIG. 17 is an end view of the series of processed print coils as shown in FIG. 16.
Figure 18:
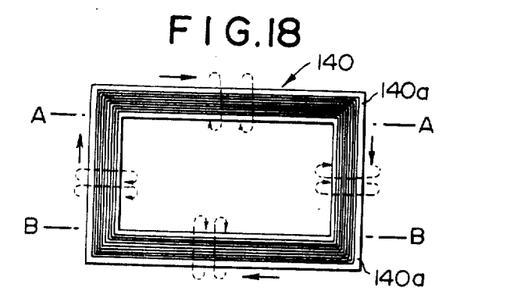
FIG. 18 is a front view of an electromagnetic coil employed in the shutter operating means as shown in FIG. 13.
Figure 19:
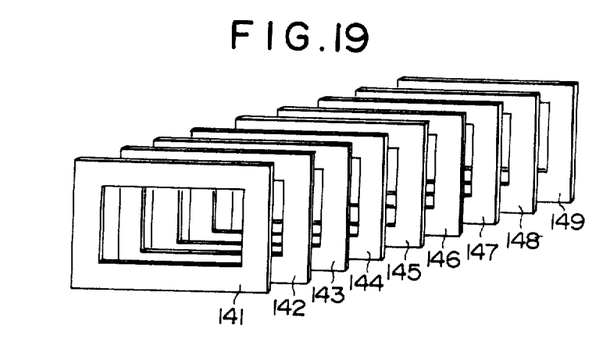
FIG. 19 is a perspective view of a series of coils arranged in a line to be put into the shape as shown in FIG. 15.
Figure 20:
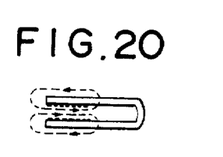
FIG. 20 is an end view of an unfavorable example of the series of coils.

The guide frame 101a consists of a number of print coils 141 to 149 arranged in series partly overlapped with each other as shown in FIG. 15. The print coils 141 to 149 are formed into a sheet of print coil 130 bound together and bent along lines A and B as shown in FIGS. 16 and 17 to be formed into the guide frame 101a. The guide frame 101a has a U-shaped cross section having bent portions 131 at both ends thereof as shown in FIG. 17. On the bottom of the U-shaped portion of the guide frame 101a is provided a guide groove 102a made of a plastic member 102 as shown in FIG. 13. The print coil sheet 130 is made by combining a number of coil elements 140 as shown in FIG. 18 arranged in a line partly overlapped with adjacent elements as shown in FIG. 19. The coil elements 140 are bound together by use of polyester resins molded together with the coil elements 140. From the viewpoint of protection of the coil elements 140, it is desirable to cover the print coil sheet 130 with a thin film of polyester resins. It is possible to mold the print coil elements 140 directly into the U-shaped form as shown in FIGS. 16 and 17. End portions 131 of the print coil sheet 130 which correspond to the nonactive portions 140a shown in FIG. 18 are bent as shown in FIG. 17 for the purpose of preventing the magnetic force of the guide frame 101a to drive the shutter blinds from being weaked by the nonactive portions 140a. If the nonactive portions 140a are not bent as shown in FIG. 20, the nonactive portions 140a will act to give a lateral force to the permanent magnets 114 and 124 and thereby preventing the smooth movement of the shutter blinds 111 and 121 along the guide frames 101a and 101b.

The shutter frame 101a as described above is provided with a series of electric contacts 105a to 105i arranged in a line thereon as shown in FIG. 14. The contacts 105a to 105i are connected with print coils 104a to 104i molded in the guide frame 101a. Said brushes 115a and 125a are in slidable contact with the contacts 105a to 105i so that the print coils 104a to 104i may be successively energized to move the permanent magnets 114 and 124 and accordingly the shutter blinds 111 and 121 along the guide frames 101a and 101b.

In the embodiment shown in FIG. 13, the end member 113 of the leading blind 111 is provided with a bent portion 113a which is to be engaged with hooks 123a which are mounted to the free end member 123 of the trailing blind 121 so that the end member 113 of the leading blind 111 is firmly engaged with the end member 123 of the trailing blind 121 when the shutter blinds 111 and 121 are in the closed positions. The engagement between the bent portion 113a and the hooks 123a is weak enough to allow the former to be disengaged from the latter when the leading blind 111 is moved to the left by the force produced between the permanent magnet 114 and the coils 104a to 104i. In addition, a pair of hooks 126 are provided to hold the trailing blind 121 when the latter is in the shrunk position as shown in FIG. 13. These hooks 126 are removed from the trailing blind 121 to release the same when the trailing blind 121 is to start. The hooks 126 can be removed by use of electromagnetic means which is operated by a signal from a shutter speed control circuit.

I claim:

1. A shutter blind for a photographic camera for opening and closing a film aperture in a camera body comprising a light impervious flexible sheet having a number of accordion pleats forming parallel folding lines therebetween, said sheet being shrinkable and expandable in the direction perpendicular to said folding lines and having an exposure opening in the middle thereof extending parallel to said folding lines, and both ends of said sheet being fixed to the camera body at opposite ends of a film aperture.

2. A shutter blind as defined in claim 1 wherein said exposure opening is a slit.

3. A shutter blind as defined in claim 1 wherein said exposure opening is a rectangular opening.

4. A shutter for a photographic camera comprising a shutter blind made of accordion shaped flexible sheet which is shrinkable in one direction to open a film aperture in a camera, one end of said shutter blind being stationarily fixed to the camera at an end of the film aperture and the other end of said shutter blind being made free to move across the film aperture, and means for moving said free end of the shutter blind to move the same across the film aperture comprising a permanent magnet mounted to said free end of the shutter blind, and a line of electromagnetic coils arranged in a line along one side of the shutter blind, said permanent magnet and said line of coils constituting a linear motor which effects to electromagnetically drive the free end of the shutter blind in one direction.

5. A shutter as defined in claim 4 wherein said free end of the shutter blind is provided with a pair of brushes, said coils are provided with electric contacts respectively with which one of said pair of electric brushes is in slidable contact, and a slide contact connected with said coils by way of a power source is provided so that the other of said pair of electric brushes is in slidable contact therewith.

6. A shutter as defined in claim 4 wherein said electromagnetic coils are a line of print coils arranged in a line.

* * * * *